May 22, 1928.   1,670,848
H. M. DENYES
STEERING MECHANISM
Filed Oct. 22, 1924
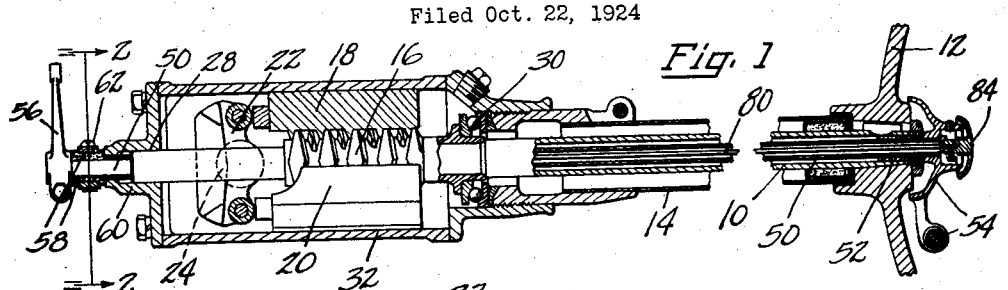
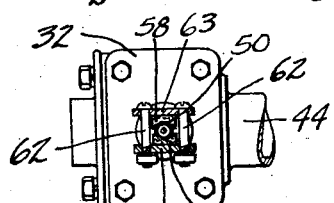
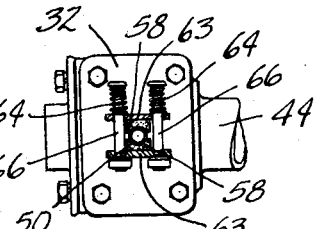
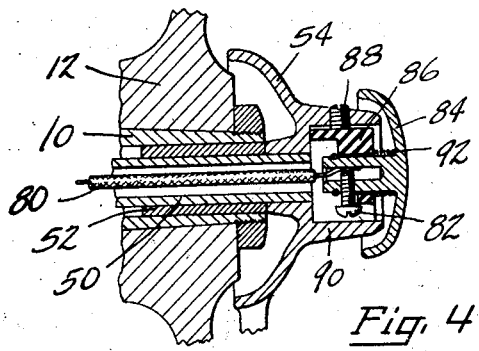
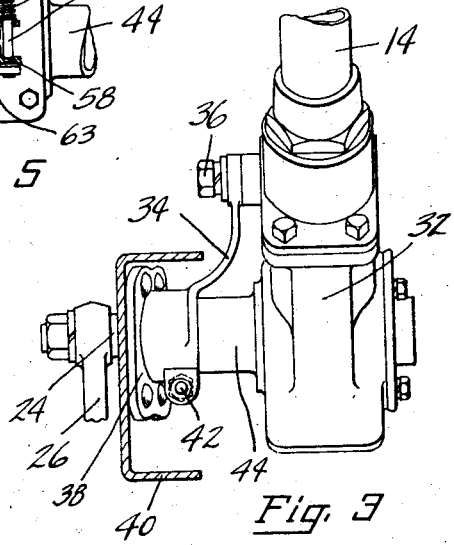
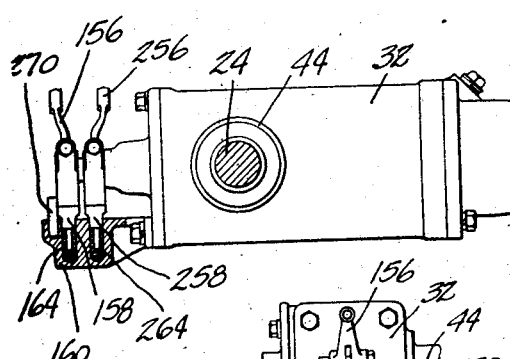
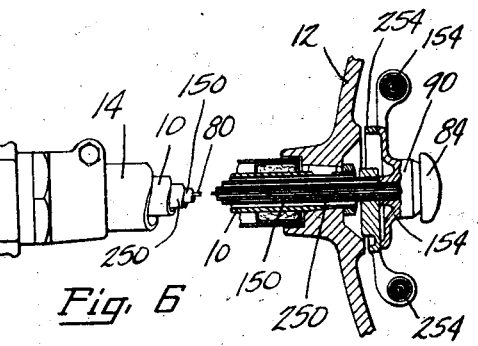
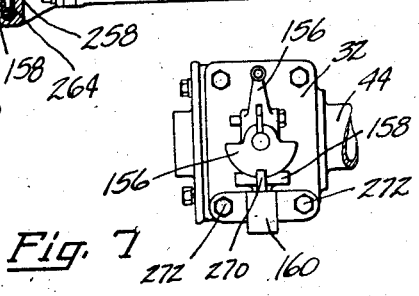
INVENTOR
*Harry M. Denyes*
BY
ATTORNEYS Patented May 22, 1928.

1,670,848

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING MECHANISM.

Application filed October 22, 1924. Serial No. 745,163.

This invention relates to steering mechanism, and is illustrated as embodied in a steering gear of the well-known "Jacox" type, in which a cross shaft carrying the steering arm is operated by a pair of oppositely-threaded half nuts engaging a right-and-left thread on the steering column.

An important object of the invention is to provide a gear having a center control, e. g. for spark or throttle, and preferably also for the horn circuit or other electric circuit, and which will be on a competitive basis as to manufacturing cost with steering gears having outside controls. As one important step in attaining this object, I eliminate the stationary tube heretofore considered essential for supporting part of a ratchet or friction brake holding the center control in adjusted angular position, and provide in place thereof novel means at the bottom of the steering column for holding the control in adjusted position. Where coaxial members are used for spark and throttle controls, friction brakes or the like adjacent the bottom of the steering column are arranged to hold the control members independently of one another.

Whether the means for holding the control is at the top or bottom of the steering column, a substantial saving may be made by forming the operating member or handle to contain an electric switch connected to an insulated conductor passing through the hollow control member, and operated by a horn button or the like. This does away with the usual separate stationary plate specially formed to contain the switch. In the particular arrangement illustrated, the horn button is connected to the conductor, and is grounded when depressed against the upper edge of a hollow boss formed in the operating member.

Other objects and features of the invention, including a novel torque arm permitting the use of an inexpensive and relatively fragile housing for the operating gear, and other novel combinations and desirable particular constructions, will be apparent from the following description of the illustrative embodiments shown in the accompanying drawings, in which:

Figure 1 is a longitudinal section through a "Jacox" gear modified as described above;

Figure 2 is a section on the line 2—2 of Figure 1, showing the means at the bottom of the steering column for holding the control member;

Figure 3 is a rear elevation of the bottom of the steering column, showing the attachment to the frame and the arrangement of the torque arm;

Figure 4 is a sectional view on a larger scale than Figure 1, showing the parts at the top of the steering column;

Figure 5 is a view corresponding to Figure 2, but showing a differently arranged friction brake;

Figure 6 is a view, partly in longitudinal section and partly in side elevation, of a gear having two control members (e. g. spark and throttle); and Figure 7 is a bottom plan view of the gear of Figure 6.

The gear shown in Figure 1 includes a hollow shaft 10 keyed to a steering wheel 12 and inclosed in a protective housing 14. As is usual with "Jacox" gears, the shaft has a right-and-left thread 16 operating two half nuts 18 and 20 bearing on opposite arms of a yoke 22 operating a cross shaft 24 carrying the steering arm 26. The steering shaft 10 is supported at its lower end in a plain bearing 28, and above the half nuts by an adjustable anti-friction bearing 30, both bearings being carried by a housing 32 formed to provide sliding ways for the half nuts.

Heretofore it has been necessary to use a very strong and expensive housing 32, as the shocks from the road wheels are transmitted back to the half nuts 18 and 20, which form part of a substantially irreversible gear, resulting in tremendous torques tending to turn the whole steering column about the axis of shaft 24. According to one feature of my invention, housing 32 may be a cheap casting, relatively fragile, but reinforced by a strong torque member 34 connected to the housing by a bolt 36 adjacent the top ends of the half nuts, and having a flange 38 riveted or bolted to the usual side member 40 of the chassis frame. The tubular bottom of the torque member may, if desired, be split and clamped by a bolt 42 about the sleeve 44 for shaft 24.

Inside of the hollow steering shaft, and coaxial with respect thereto, is a control member 50, shown as a hollow tube extending beyond shaft 10 at both ends. Member 50, at its upper end, merely floats in shaft 10, having a bearing formed by an interposed bushing 52. In the arrangement illustrated in Figure 1, this member is intended to control the throttle, this particular gear being intended for use with an automatically-controlled spark.

At its upper end, above the steering wheel, member 50 is secured to an operating member or handle 54, by means of which it may be moved angularly to open and close the throttle. At its lower end, member 50 is secured to an arm 56 connected, by means not shown, to the throttle (or other device to be controlled). Just above arm 56, the control member is embraced by two friction blocks 58, projecting into notches in the bottom of boss 60 of housing 32 so that they cannot turn, and clamped together by bolts 62 acting on the backing members 63. As shown in Figure 5, blocks 58 may, if preferred, be yieldingly urged together by springs 64 acting on bolts 66.

It will be seen that blocks 58, or some equivalent friction brake, constitute means at the bottom of the steering column for resisting angular movement of control member 50, and holding it in adjusted position, thus eliminating the inner stationary supporting tube heretofore usually considered necessary to carry the ratchet or friction brake above the steering wheel.

I prefer to use a tubular control member 50, through which I pass an insulated wire 80, forming part of the horn or other circuit, which is clamped at its upper end by a set screw 82 in the shank of a horn button 84, of metal or having conducting material on its lower side. The shank of the horn button passes through an opening in an insulating bushing 86, held by a setscrew 88 in a central recess formed in a boss 90 of the operating member 54. Button 84 may be depressed against the resistance of a spring 92, to ground the circuit against the edge of boss 90. Setscrew 82 moves in a notch in bushing 86 to permit this movement of the button. The above parts make up an electric switch for the horn or other circuit. Button 84 is large enough to close the open end of the recess in boss 90. A dimmer switch, or an ignition switch, or the like, could also be mounted on member 54.

In Figures 6 and 7 is shown a modification having spark and throttle controls. In this arrangement, one control member 150 is secured at its upper end to an operating member 154, which may be substantially the same as the above-described member 54, and at its lower end to an operating arm 156 having a segment yieldingly engaged by a friction brake 158, having a stem sliding in a recess in a bracket 160, and urged outwardly by a spring 164. The other control member 250, coaxial with respect to member 150 and shaft 10, is secured at its upper end to a lower operating member 254, and at its lower end to an operating arm 256 having a segment engaged by a friction brake 258 urged toward it by a spring 264. A pin 270 in bracket 160 prevents loss of these parts. Bracket 160 is shown as fastened to housing 32 by bolts 272. The arrangement of the horn button 84, etc., is the same as in the first modification.

It is not my intention to limit the scope of the invention to the particular embodiments described by way of illustration, or to limit it otherwise than by the terms of the appended claims.

I claim:

1. Steering mechanism comprising, in combination, a hollow steering shaft, a steering wheel at the upper end of the shaft, an angularly-movable control member in said hollow shaft having a bearing in the upper end of the shaft and supported at its upper end only by the floating support of its bearing in the shaft, a handle above the steering wheel for turning the control member, and means at the bottom of the steering shaft for directly engaging and gripping the control member to hold it in any angular position to which it is moved by the handle.

2. Steering mechanism comprising, in combination, a hollow steering shaft, a steering wheel at the upper end of the shaft, an angularly-movable control member in said hollow shaft supported at its upper end only by its bearing in the shaft, said member being operable from above the steering wheel, and a friction brake at the bottom of the steering shaft and urged radially against the control member for holding it in any angular position to which it is moved.

3. Steering mechanism comprising, in combination, a hollow steering shaft having a steering wheel at its upper end, a control member in said shaft, means accessible above the steering wheel for angularly moving the control member, a stationary part adjacent the bottom of the steering shaft, and a friction block carried by said part and urged yieldingly radially with respect to the control member to hold it in any angular position to which it is moved.

4. Steering mechanism comprising, in combination, a hollow steering shaft having a steering wheel at its upper end, a plurality of coaxial control members in said shaft, means accessible above the steering wheel for indepenently angularly moving the control members, a stationary part adjacent the bottom of the steering shaft, and means carried by said part and directly gripping the lower ends of the control members to hold them separately in any angular position to which either may be moved.

5. Steering mechanism comprising, in combination, a hollow steering shaft, a steering wheel at the upper end of said shaft, a control member in the shaft operable from above the wheel, a stationary part adjacent the lower end of the shaft, and friction members held by said part from turning and arranged to grip the control member below the steering shaft.

In testimony whereof I affix my signature.

HARRY M. DENYES.